United States Patent [19]

Franke

[11] Patent Number: 4,639,725

[45] Date of Patent: Jan. 27, 1987

[54] PICTURE DISPLAY CASE

[75] Inventor: Martin G. Franke, Terao-Kamata 1-10-12, Ayase-Shi, Kanagawa-Ken, Japan, 252

[73] Assignee: Martin G. Franke, Tokyo, Japan

[21] Appl. No.: 596,496

[22] Filed: Apr. 4, 1984

[51] Int. Cl.[4] .............................................. G09G 3/00
[52] U.S. Cl. ........................ 340/815.02; 340/815.06; 340/815.14; 40/573
[58] Field of Search .................. 340/815.02, 815.06, 340/815.07, 828.19, 815.12, 815.14; 40/573, 575, 577

[56] References Cited

U.S. PATENT DOCUMENTS

| | | | |
|---|---|---|---|
| 3,651,512 | 3/1972 | Summers | 340/825.19 |
| 3,824,723 | 7/1974 | Gargas | 340/815.06 |
| 4,126,855 | 11/1978 | Alms et al. | 340/815.02 |
| 4,259,800 | 4/1981 | Schoenfeld | 40/573 |
| 4,333,092 | 6/1982 | Field | 340/815.06 |
| 4,406,998 | 9/1983 | Willough | 340/815.06 |

Primary Examiner—Gerald L. Brigance

Attorney, Agent, or Firm—Quarles & Brady

[57] ABSTRACT

A case for displaying pictures to an audience with the pictures being selectively illuminated at the discretion of the operator for individually bringing them to the attention of the audience. The case is provided with a panel having a plurality of lamps for illuminating pictures contained on a picture panel that is positioned in front of the lights. A plurality of switches are provided for controlling the operation of the lamps with the number of switches being equal to the number of lamps on the panel so that each individual lamp can be operated by its associated switch. However, the different picture panels have various numbers of pictures in a variety of sizes and arrangements so that the individual panels require the operation of different lamps for illuminating the pictures. The control circuit is arranged to recognize these panels and automatically adjust so that the switches are always operable in sequence beginning with the first switch for sequentially illuminating the pictures on the panel even though only a portion of the switches are required to illuminate the pictures on that particular panel.

6 Claims, 12 Drawing Figures

PICTURE DISPLAY CASE

BACKGROUND OF THE INVENTION

The present invention relates generally to a case for displaying pictures and more particularly to a case especially adapted to illuminate one or more pictures of a group of pictures selectively for viewing by an audience.

It is frequently desired to present pictures for viewing by an audience. At times a group of pictures may be made available for viewing but one or more pictures of the group are brought to the attention of the audience selectively. This may be done by illuminating the selected pictures of the group.

For example, such an arrangement is conveniently employed when teaching a language. The teacher brings a particular picture to the attention of the students for the purpose of naming it in the language being taught. The particular lesson may require a group of pictures all of which are exposed to the class but the teacher selects the particular picture to be described by illuminating it.

Accordingly, it is a general object of the present invention to provide an improved display case for presenting pictures to an audience.

It is a further object of the present invention to provide a picture display case for presenting a group of pictures to an audience that is especially adapted to illuminate one or more of the group selectively, at the discretion of the operator.

It is another object of the present invention to provide a picture display case for receiving a different number of pictures in different patterns for display which will adjust automatically to the number and pattern of pictures displayed to enable the switches to be operated consequently to illuminate the pictures.

SUMMARY OF THE INVETION

The picture display case of the present invention comprises a rectangular frame with space for retaining a box containing an electronic circuit. A light panel of rectangular configuration is fitted into the opening in the frame. The light panel supports the maximum number of lamps required in an appropriate pattern as required for illuminating the pictures either individually or in combinations selectively. These lamps are connected to be controlled by the electronic circuit for operation by a set of switches in a sequence and pattern depending upon the number and pattern of the pictures on display.

In the illustrated embodiment, a plurality of dividers are provided for insertion into the frame over the lamp panel. Each divider is provided with a different number of openings in a different pattern and size for accommodating the number and arrangement as well as the size of the pictures that are to be displayed. A chart or picture panel containing the pictures to be displayed is inserted into the frame which results in each one of the pictures being in alignment with one of the coatings in the divider.

The number of pictures on the panel will vary and some panels may have the same number of pictures but in different patterns. The openings in the divider will vary accordingly. Therefore the different panels having different numbers and arrangements of pictures will require different lighting. The lighting is varied by energizing the lamps in different combinations with each combination providing the best lighting for each picture on the particular panel in the frame.

The lighting arrangement is adjusted automatically. Three light sensitive elements are actuated in different combinations to provide the desired switch connections and lighting patterns. To this end three optocouplers are mounted on the light panel for cooperation with reflective material on the back of the dividers. Three locations on the back of the dividers are provided for receiving the reflective material and these locations are in operating alignment with the three optocouplers on the light panel. The presence of the reflective material at a particular location causes a light beam from the optocoupler to be reflected back to the light sensitive element to actuate it and render it conductive to thereby produce a logic 1. The absence of the reflective material, on the other hand, produces a logic 0 by its failure to reflect the light for necessary to activate the optocoupler. These different combinations of logic 1's and logic 0's serve to identify the panels of pictures inserted in the frame.

The electronic circuit utilizes this information not only to establish the lighting arrangement but to connect the switches to accommodate the number of pictures on the picture panel so that the switches can be actuated consecutively beginning with the first one. Thus, if six pictures are on a panel, the first six switches will be operable in numerical order for lighting the individual pictures at the discretion of the operator.

BRIEF DESCRIPTION OF THE DRAWINGS

The foregoing and other objects of this invention, which will become more fully apparent from the following detailed description, may be achieved by means of the exemplifying apparatus depicted in and set forth in the specification in connection with the accompanying drawings, in which.

DETAILED DESCRIPTION OF THE PREFERRED EMBODIMENT

Figure 1:
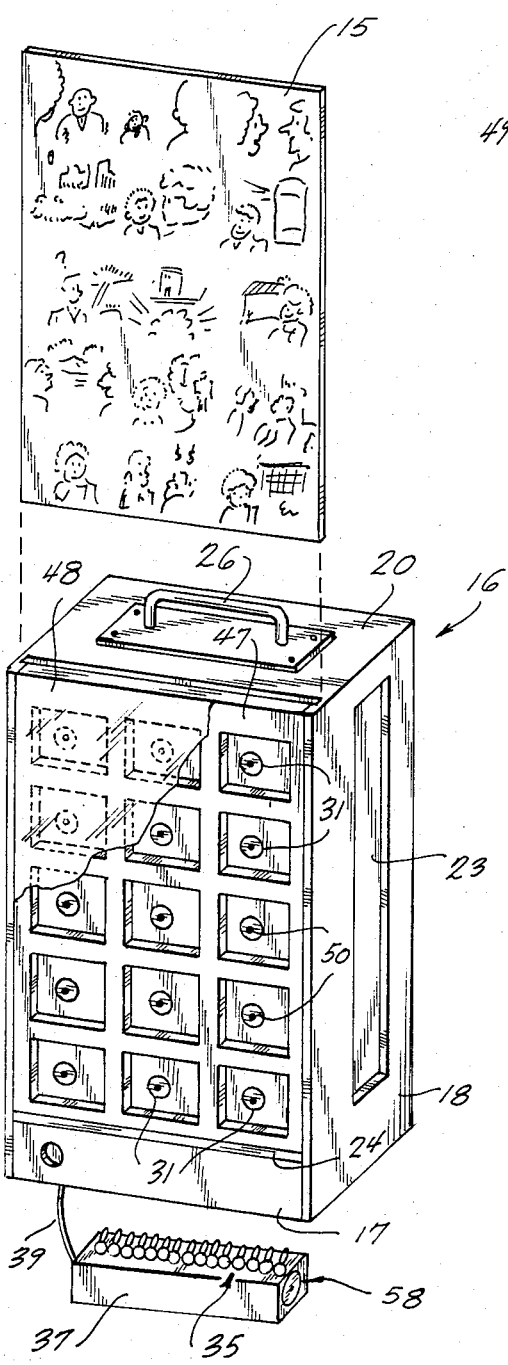
FIG. 1 is a perspective view of a picture case constructed in accordance with the teachings of the present invention having a fifteen light opening divider installed in the frame and a panel of pictures in position to be slid into the frame over the divider.
Figure 2:
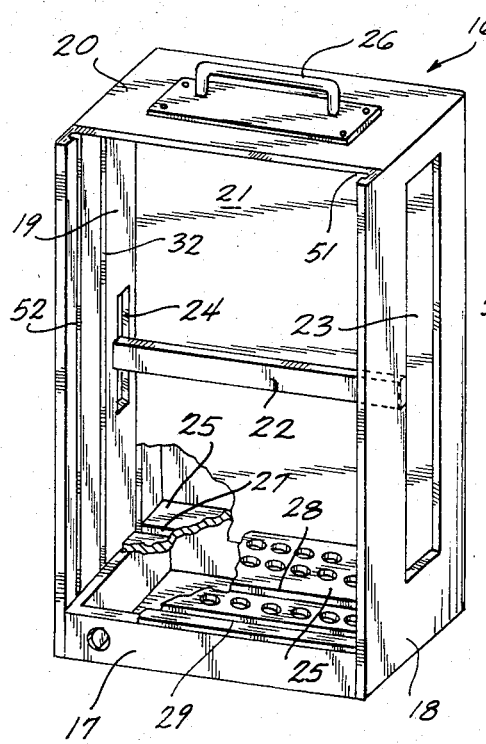
FIG. 2 is a perspective view illustrating the frame for supporting the pictures with its enclosure at the base for containing the associated electric equipment.

Reference is now made more particularly to the drawings and specifically to FIG. 1 thereof illustrating a picture display case constructed in accordance with the teachings of the present invention and showing a sheet or panel of pictures 15 in position to be inserted into the case for viewing. The case comprises a frame generally identified by the reference numeral 16 and formed of an enclosure 17 at the bottom for containing the electrical circuitry. In the illustrated embodiment an elongated plastic sheet is formed with the required slots and grooves and then bent to form a top panel 20 with parallel and spaced side panels 18 and 19 disposed at ninety degrees from the top panel 20. The bottom ends of the side panels 18 and 19 are attached to the enclosure 17 to form the frame 16. The rear of this frame is closed by a back panel 21 as shown in FIG. 2 with the front of the frame being open for receiving the operating elements. The back panel 21 is inserted slightly forward in the frame 16 to provide storage space in back of the case.

Figure 3:
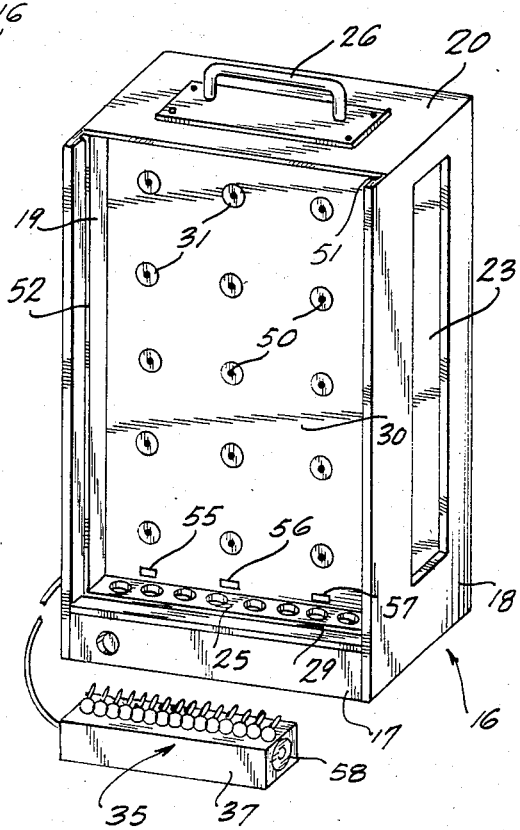
FIG. 3 is a perspective view showing the frame depicted in FIG. 2 with the lamp panel installed and the switches connected.
Figure 8:
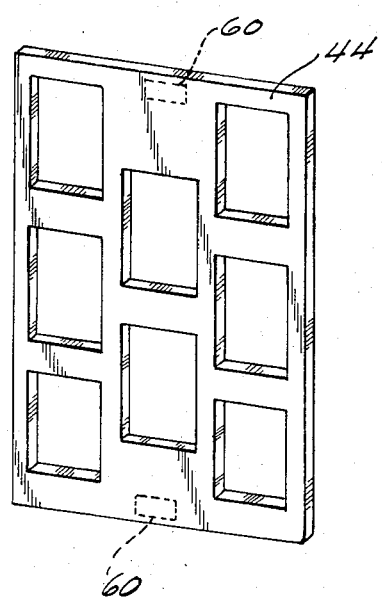
Figure 9:
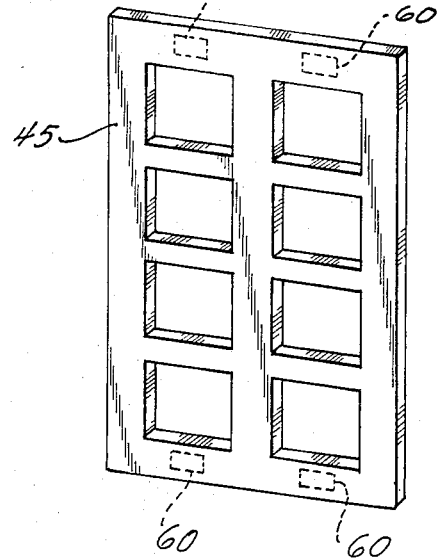
Figure 4:
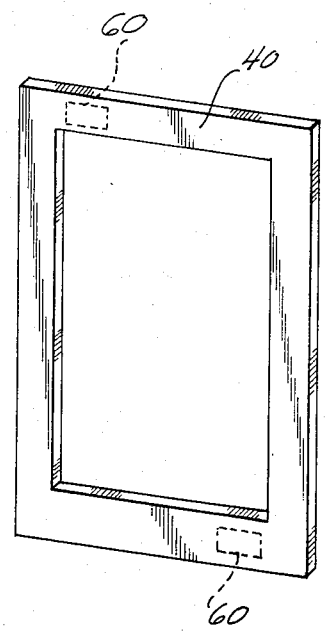
Figure 5:
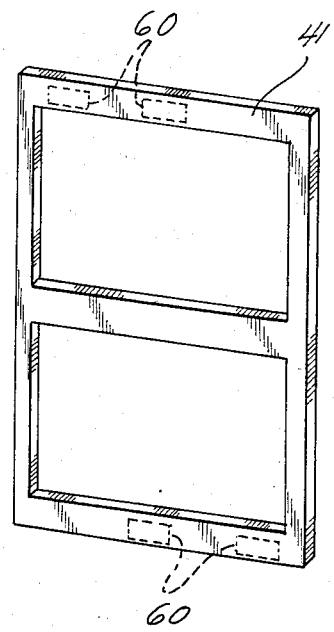
Figure 6:
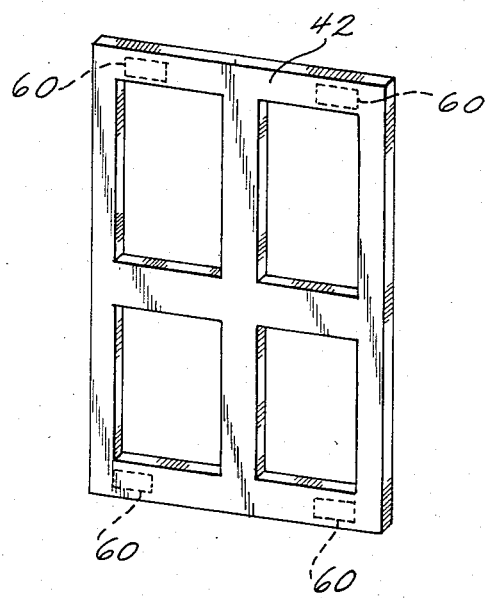
Figure 7:
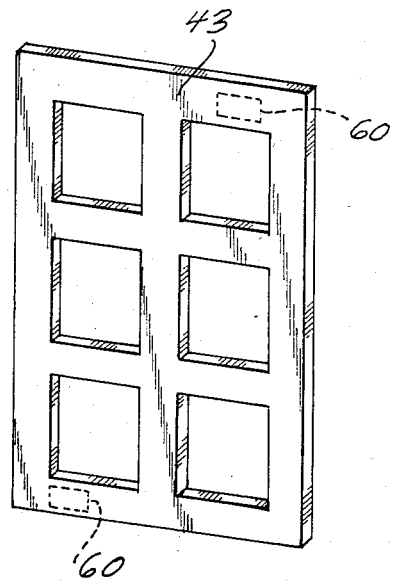

A structural member 22 extends across the frame between the side panels 18 and 19 with one end of the member 22 being attached to the side panel 19 and its opposite end being attached to the side panel 18. The side panel 18 includes a long longitudinal opening 23 while the panel 19 is provided with a smaller opening 24 for a purpose to be later described. The enclosure 17 contains the electrical circuitry shown schematically in FIG. 12. It is provided with a cover 25 that has three parallel slots 27, 28 and 29 formed in it. These slots extend across the width of the frame 17. The slot 27 serves to receive the bottom edge of the back panel 21 while the bottom edge of a light panel 30, shown in FIG. 3 is disposed within the slot 28. The slot 29 is in position to receive the bottom edge of the picture panel 15. A plurality of holes are formed in the cover 25 to provide air circulation about the electrical components within the enclosure 17. In addition, a handle 26 is attached to the top panel 20 to facilitate handling the unit.

As shown in FIG. 3, a lamp panel 30 is mounted in the frame 16 so that it is positioned in front of the structural member 22 leaving a space between the member 22 and the back panel 21. The lamp panel 30 is retained in position by a pair of slots 32 in the side panels 18 and 19 respectively as well as the slot 28 in the cover 25. The lamp panel 30 includes fifteen light bulbs or lamps 31 which are employed to light the pictures to be displayed in the case. The light bulbs 31 are energized in different combinations depending upon the number and pattern of the openings in the divider that is inserted into the display case. In addition, they are energized at the discretion of the operator for viewing by the audience. To this end, the light bulbs 31 on the panel 30 are controlled by the electronic circuitry in the enclosure 17 and are under the control of the operator by means of a plurality of switches 35. The switches 35 are mounted on a control box 37 that is connected to the electronic circuitry in the enclosure 17 by a conduit 39.

Figure 10:
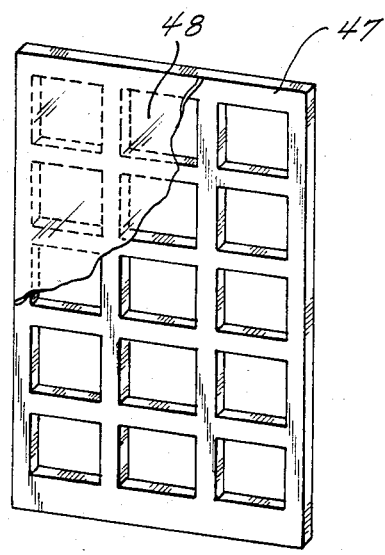
FIGS. 4 to 10 are perspective front views of dividers, each with a different number of openings and each identified by reflective material.

A plurality of dividers illustrated in FIGS. 4 to 11, inclusive, and identified by the reference numerals 40 to 47, respectively, are provided. Any one of these dividers is fitted into the front opening of the frame 16 to overlie the lamp panel 30 for dividing the light emanating from the lamps 31 onto the individual pictures being displayed. To this end, each divider 40 through 47 is provided with a different number of openings depending upon the number of pictures contained on the panel 15 that will be inserted into the frame 16. Thus, the divider 40 includes one large opening for framing a single large picture on the panel 15. On the other hand, the divider 47 shown in FIG. 10 is provided with fifteen openings for accommodating a panel 15 with fifteen separate pictures on it as illustrated in FIG. 1.

The dividers 40 to 47 serve to confine the light onto each individual picture. In order to avoid a concentration of the light into a point on the picture, each lamp is provided with an opaque spot 50 at its top central area which will diffuse the light for uniform application over the entire picture. In addition the dividers 40–47 are covered with a white translucent material 48, as shown in FIG. 10, that will further diffuse the light. The dividers that are not in use can be stored between the light panel 30 and structural member 22 which space is rendered accessible by the opening 23. Moreover the opening 24 on the opposite panel provides access to the space for facilitating the handling of the dividers in storage. Additional dividers can be stored behind the back panel 21.

The panel 15 containing the pictures is inserted into a pair of slots 51 and 52 formed in the panels 18 and 19, respectively. Prior to the insertion of the panel 15, the appropriate divider is fitted into the front opening against the lamp panel 30. The divider 47 is shown partially inserted into the front opening in FIG. 1 and it will be moved in far enough to expose the slots 51 and 52 in front of it. The panel 15 containing the pictures is then slid into the slots 51 and 52 to overlie the divider in the case. Each of the pictures on the sheet 15 will overlie one of the openings in the divider. The pictures are therefor illuminated from the back by an energized lamp 31. The light passes through the cooperating opening in the divider and the translucent material 48 covering the divider and through the translucent material which contains the picture.

Figure 11:
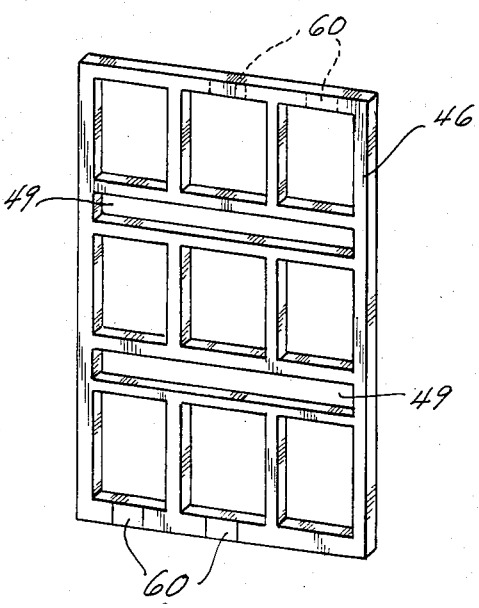
FIG. 11 is a perspective rear view of a divider showing recessed areas for accepting light bulbs that are not being used.

The nine opening divider 46 shown in FIG. 11 includes a pair of recessed areas 49 for accepting light bulbs 31 on the light panel 30 that are not being used. Similar storage spaces can be furnished in the other dividers if required. The pictures on the panel 15 will correspond in number and arrangement with the number and arrangement of the openings in the various dividers 40 to 47 inclusive. It will therefore be necessary to energize the lamps 31 in different combinations to accommodate the particular divider in the frame 16 for lighting the accompanying pictures on the panel 15. Moreover, there are fifteen switches 35 for activating the fifteen lamps 31 in the sequence from 1 to 15. This is convenient if a sheet 15 containing 15 pictures and the divider 47 is in the display case. However, if a panel 15 with six pictures and the divider 43 are in the case, the operator would have to manually operate the switches one, three, seven, nine, thirteen and fifteen to illuminate the respective pictures. Other combinations of switches would have to be memorized or listed to accommodate the eight different patterns of pictures provided in this exemplary embodiment.

The present invention contemplates simplifying this entire procedure by suitable electronic circuitry and two processor appropriately programmed so that if the divider 43 containing six openings is placed in the frame along with a panel 15 containing six pictures arranged in the same manner, the unit automatically adjusts so that switches 1 to 6 are employed for lighting the six individual pictures. In like manner, if divider 44 were inserted into the case 16 the electronic circuitry would automatically adjust to accommodate the openings in the divider 44 by operating switches one to eight for lighting the eight individual pictures on the sheet 15. The lights would accommodate the arrangement of the eight openings in the divider 44 as distinguished from the eight openings in the divider 45 which are in a different arrangement. However, if the divider 45 were placed in the frame 16, switches one to eight would still be used but they would activate the lights in a different manner than when the same switches are activated with the divider 44 in the frame 16.

In order to accomplish this, each of the dividers 40 to 47 inclusive is identified when it is placed in the frame 16 overlying the light panel 30. To this end, three optocouplers or photocouplers 55, 56 and 57 are mounted on the light panel 30 as clearly shown in FIG. 3. These three optocouplers are rendered conductive in different combinations for identifying each of the dividers 40 to 47. The optocouplers include a light sensitive element and generate a beam of light which is directed away from the unit. However, if the light strikes a reflective material it reflects back onto the unit to activate the light sensitive element and render the unit conductive. Therefore, each of the dividers 40 to 47 is provided with a space on its back surface for receiving a reflective material 60 which cooperates with the optocouplers 55, 56 and 57 for activating them. The reference material 60 is placed on the back of the dividers in a different combination for each divider for activating the photo-couplers in various combinations to identify the particular divider in the frame 16. Thus, it will be noted that the divider 40 shown in FIG. 4 has a single opening and it has one reflective element on its right side in back so that the optocoupler 55 will be activated. This identifies the panel 15 with one large picture on it and it will only be necessary to activate the first of the switches 35 for energizing all of the lamps 31 on the lamp panel 30. On the other hand, the divider 43 includes a reflective material 60 on its left side rear location, as viewed in FIG. 7, for activating the optocoupler 57. This will cause the lamps 1, 3, 7, 9, 13 and 15 to be activated respectively by the actuation of the first six of the fifteen switches 35. The dividers are provided with the identifying reflective material at both their top and bottom rear edges, as shown, so that they can be installed in either position.

A rotary switch 58 is mounted on the end of the box 37 for automatic operation. Position "1" on this switch is the "off" position enabling the lights to be energized by the manual operation of the switches 35 selectively. However, for automatic operation of the lights, either in sequence or at random, the rotary switch 58 is moved from its "off" position to one of the numbers on the dial. The timing of the light energization is regulated by the position of the rotary switch with the time of energization of each lamp in the automatic mode increasing as the switch is positioned to a higher number. The lamp energization is the shortest when the rotary switch is positioned to the number "2" on the dial and the maximum time of energization of each lamp occurs when the switch is set to the number "16".

The invention has been described to include the dividers 40 to 47 for the purpose of providing a frame for each of the pictures on the panels 15 as a convenient arrangement for confining the available light to the area of the picture being viewed to thereby concentrate such light over the entire picture area. Other means of concentrating the light may be employed. For example, the dividers could be omitted when the light bulbs 31 are arranged to focus the light or provide a collimated light beam that encompasses the entire area of the picture and is confined to that area. In such case the reflective material 60 would be placed directly on the picture panels 15 for identifying the number of pictures on the panel and their pattern.

Figure 12:
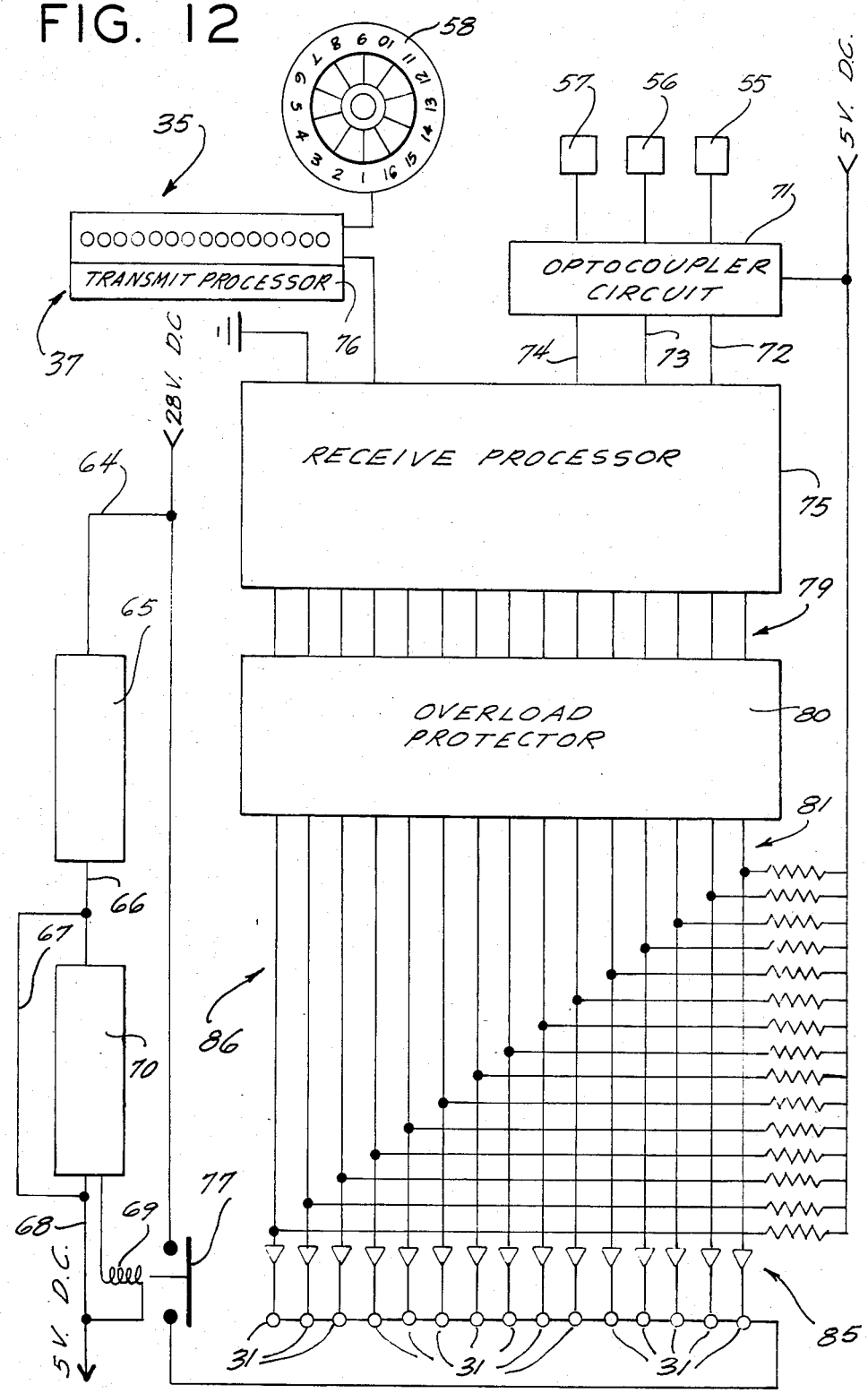
FIG. 12 is a schematic view of the electrical circuitry for controlling the operation of the lamps.

The circuitry for controlling the operation of the fifteen lamps 31 in the switches 35 is illustrated in FIG. 12. The lamp and electrical circuit are energized by a direct current source of 28 volts which proceeds through a conduit 64 to a voltage divider 65. The latter serves to reduce the voltage of the source to five volts which is transmitted through a conductor 66 and through a branch conductor 67 to a conductor 68 for energizing the electronic circuitry. The voltage from the regulator 65 also flows through the conductor 66 into a delay circuit 70 which delays the flow of the voltage to a relay 69 until the electronic circuit is operating. The energization of the relay 69 closes a normally open contact 77 which completes a circuit from the 28 volt source to the fifteen lamps 31 for energizing them under the control of the electronic circuitry.

As previously mentioned, the three optocouplers 55, 56 and 57 are activated in different combinations for regulating the operation of the lamps 31 in conjunction with the fifteen switches 35. All three optocouplers 55, 56 and 57 are connected to an optocoupler circuit 71 which has three outputs 72, 73 and 74 that are connected to a receive processor 75. The outputs 72, 73 and 74 are associated with the optocouplers 55, 56 and 57 respectively and transmit a signal to the receive processor if the associated optocoupler has been activated by the reflective material 60.

The receive processor 75 utilizes these signals to regulate the operation of the switches 35 for activating the lamps 31 in the manner previously described so that the switches will operate in sequence beginning with the first switch for activating the lamps 31 in the proper combination to light the pictures on the panel 15. The program listing for causing the central processing unit to operate in this manner is furnished in the attached Appendix. The switches 35 are connected to a transmit processor 76 contained in the control box 37. The transmit processor generates data that indicates the actuation of the individual switches and this information is transmitted to the receive processor.

The receive processor 75 is provided with fifteen outputs 79 with every one of the outputs 79 communicating with a different one of the lamps 31. The outputs 79 are connected to an overload protector 80 which serves to protect the circuit. The overload protector 80, in turn, has fifteen outputs 81 and each of these outputs 81 is connected to a separate transistor in a transistor array generally identified by the reference numeral 85. The transistors in the transistor array 85 are rendered conductive by a high level logic output in the conductors 81 for the purpose of energizing the lamps 31. Whether or not a particular transistor in the transistor array 85 is rendered conductive depends, of course, upon whether its associated output 79 from the receive processor 75 is transmitting the required voltage. When a particular transistor in the array 85 is rendered conductive, it completes the 28 volt circuit for its associated lamp through an associated conductor 86 and its collector and emitter (not shown) to ground for energizing the lamp with which it cooperates.

The foregoing describes an improved picture display case in which sheets containing pictures in different numbers and different arrangements can be illuminated by a panel of lights energized in different combinations. Depending upon the number and arrangement of the pictures, the switches for activating these lights function in sequence beginning with the first switch, regardless of the number and arrangement of pictures, for the convenience of the operator.

Although the illustrative embodiment of the invention has been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

APPENDIX

Transmit Processor

```
                    V 2.0

BANK 0       REGISTER ASSIGNMENT
                   R0 --- DATA SAVE REGISTER
                   R1 --- LOOP COUNTER
                   R2 --- TIMER COUNTER [ 10  usec ]
                   R3 --- TIMER COUNTER [  1  msec ]
                   R4 --- WORK REGISTER
                   R5 --- WORK REGISTER
                   R6 --- OLD DATA 1
                   R7 --- OLD DATA 2
```

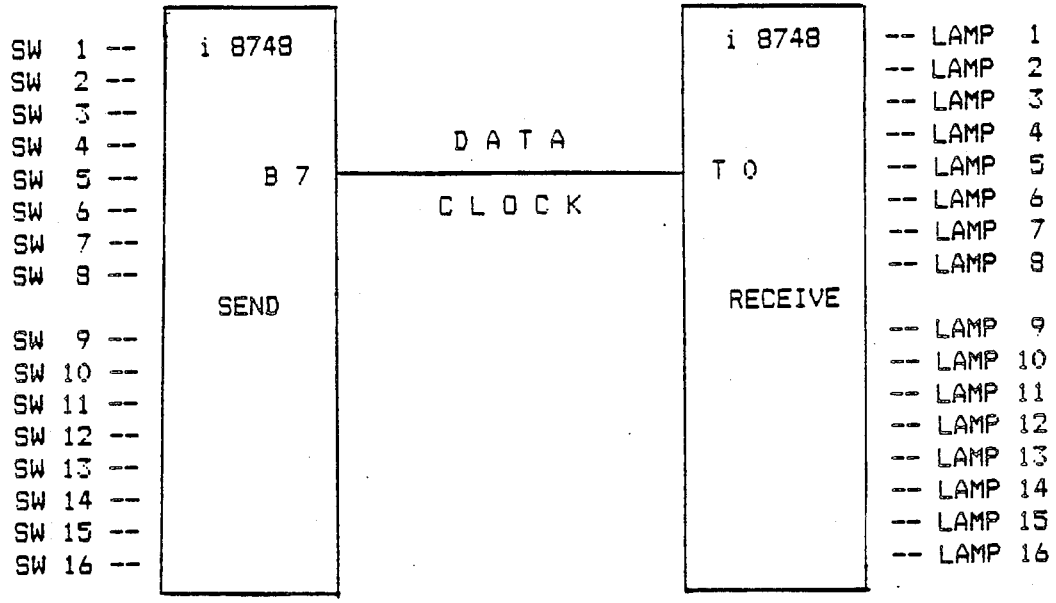

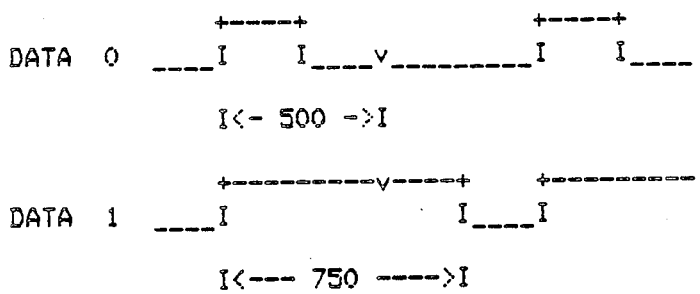

```
                                        CHART      BIT 7,6,5
                                        NO. 15        0 0 0
                                        NO. 6         1 0 0
                                        NO. 8-1       0 1 0
                                        NO. 8-2       1 0 1
                                        NO. 9         1 1 0
                                        NO. 2         0 1 1
                                        NO. 4         1 1 1
                                        FULL SIZE     0 0 1
``` v   is DATA READ POINT
UNIT is micro second

MAIN ROUTINE

```
              ORG     0
              CALL    INITRST         INITIAL RESET
              MOV     R2,#0           SET DELAY COUNT MAX [ 256 msec ]
              CALL    DELAY           CALL DELAY SUBROUTINE [ 256 msec ]
              CALL    DELAY           CALL DELAY SUBROUTINE [ 512 msec ]
              CALL    PROTECT         CALL BASIC CIRCUIT PROTECT ROUTINE
              CALL    BEGIN           START OK? or NOT?
    START     IN      A,P1            READ DATA FROM I/O PORT 1
              CPL     A               INVERT DATA
              MOV     R0,A            STORE DATA TO REGISTER 0
              XRL     A,R6            EXCLUSIVE OR R6 TO A
              JZ      NEXT            IF R6 = A THEN GOTO NEXT
              MOV     R2,#2           SET DELAY COUNT 2 [ 2 msec ]
              CALL    DELAY           CALL DELAY SUBROUTINE
              IN      A,P1            READ DATA FROM I/O PORT 1 AGAIN
              CPL     A               INVERT DATA
              XRL     A,R0            EXCLUSIVE OR R0 TO A
              JNZ     NEXT            IF R0 NOT EQ A THEN GOTO NEXT
              MOV     A,R0            LOAD NEW DATA
              MOV     R6,A            STORE NEW DATA TO T6
              CALL    SEND            IF R0 = A THEN CALL SEND DATA SUBROUTINE
              JMP     START           MAIN LOOP
    NEXT      IN      A,P2            READ DATA FROM I/O PORT 2
              CPL     A               INVERT DATA
              MOV     R0,A            STORE DATA TO REGISTER 0
              XRL     A,R7            EXCLUSIVE OR R7 TO A
              JZ      START           IF R7 = A THEN GOTO MAIN LOOP
              MOV     R2,#2           SET DELAY COUNT 2 [ 2 msec ]
              CALL    DELAY           CALL DELAY SUBROUTINE
              IN      A,P2            DATA READ FROM I/O PORT 2 AGAIN
              CPL     A               INVERT DATA
              XRL     A,R0            EXCLUSIVE OR R0 TO A
              JNZ     START           IF R0 NOT EQ A THEN GOTO MAIN LOOP
              MOV     A,R0            LOAD NEW DATA
              MOV     R7,A            STORE NEW DATA TO R7
              CALL    SEND            IF R0 = A THEN CALL SEND DATA SUBROUTINE
              JMP     START           MAIN LOOP
              INITIAL RESET
    INITRST   DIS     I               DISABLE H/W INTERRUPT
              DIS     TCNTI           DISABLE TIMER INTERRUPT
              CLR     A               CLEAR ACC
              OUTL    BUS,A           CLEAR BUS PORT
              CPL     A               INVERT ACC DATA
              OUTL    P1,A            INITIALIZE I/O PORT 1
              OUTL    P2,A            INITIALIZE I/O PORT 2
              RET
              DATA READ FOR BASIC CIRCUIT PROTECTION
    PROTECT   IN      A,P1            READ SW DATA FROM I/O PORT 1
              CPL     A               INVERT DATA
              JNZ     PROTECT         IF DATA IS NOT 0 THEN GOTO START POINT
              IN      A,P2            READ SW DATA FROM I/O PORT 2
              CPL     A               INVERT DATA
              JNZ     PROTECT         IF DATA IS NOT 0 THEN GOTO START POINT
              RET
```

```
        START
BEGIN   IN      A,P1            READ SW DATA FROM I/O PORT 1
        CPL     A               INVERT DATA
        JNZ     RETURN          IF DATA IS NOT 0 THEN GOTO RETURN
        IN      A,P2            READ SW DATA FROM I/O PORT 2
        CPL     A               INVERT DATA
        JZ      BEGIN           IF DATA IS 0 THEN GOTO LOOP
RETURN  RET
        TIME DELAY SUBROUTINE 1
ITIME   NOP                     NO OPERATION  2.5 usec
        NOP                     NO OPERATION  5.0 usec
        DJNZ    R2,ITIME        LOOP TIME     10.0 usec
        RET
        TIME DELAY SUBROUTINE 2
DELAY   MOV     A,R2            CLEAR ACC
        MOV     R3,A            SET LOOP COUNT FROM R2 TO R3
DLOOP   MOV     R2,#100         SET LOOP COUNT 100 [ 1 msec ]
        CALL    ITIME           CALL 10 usec DELAY
        DJNZ    R3,DLOOP        IF R3=0 THEN RETURN
        RET
        DATA SEND SUBROUTINE
SEND    MOV     R5,#2           SET LOOP COUNT 2
        IN      A,P1            READ FIRST 8 DATA's
MLOOP   CPL     A               INVERT DATA
        MOV     R0,A            STORE DATA TO R0
        MOV     R1,#8           SET LOOP COUNT 8
LOOP    MOV     A,R0            LOAD DATA
        JB7     SEND1           IF BIT 7 IS ON THEN GOTO SEND BIT 1
        ORL     A,#80H          BIT 7 ON
        OUTL    BUS,A           OUTPUT DATA
        MOV     R2,#25          SET DELAY COUNT 25 [ 250 usec ]
        CALL    ITIME           WAIT 250  usec
        ANL     BUS,#00H        DATA OFF
        MOV     R2,#75          SET DELAY COUNT 75 [ 750 usec ]
        CALL    ITIME           WAIT 750  usec
        MOV     A,R0            LOAD DATA
        RR      A               ROTATE ACC RIGHT
        MOV     R0,A            STORE DATA
        DJNZ    R1,LOOP         SEND LOOP
        JMP     EOS             JUMP END OF SEND
SEND1   OUTL    BUS,A           OUTPUT DATA
        MOV     R2,#75          SET DELAY COUNT 75 [ 750 usec ]
        CALL    ITIME           WAIT 500 usec
        ANL     BUS,#00H        DATA OFF
        MOV     R2,#25          SET DELAY COUNT 25 [ 250 usec ]
        CALL    ITIME           WAIT 250 usec
        MOV     A,R0            LOAD DATA
        RR      A               ROTATE ACC RIGHT
        MOV     R0,A            STORE DATA
        DJNZ    R1,LOOP         SEND LOOP
EOS     IN      A,P2            READ SECOND 8 DATA's
        DJNZ    R5,MLOOP        IF R5 NOT EQ 0 THEN GOTO MLOOP
        RET
        END
```

Receive Processor
V 10.0
BANK 0    REGISTER ASSIGNMENT
          R0 --- DISPLAY DATA 1
          R1 --- DISPLAY DATA 2
          R2 --- TIMER COUNTER [ 10 usec ]
          R3 --- LOOP COUNTER and TEMP WORK REGISTER
          R4 --- IMMEDIATE DATA
          R5 --- WORK REGISTER
          R6 --- RAW DATA 1
          R7 --- RAW DATA 2
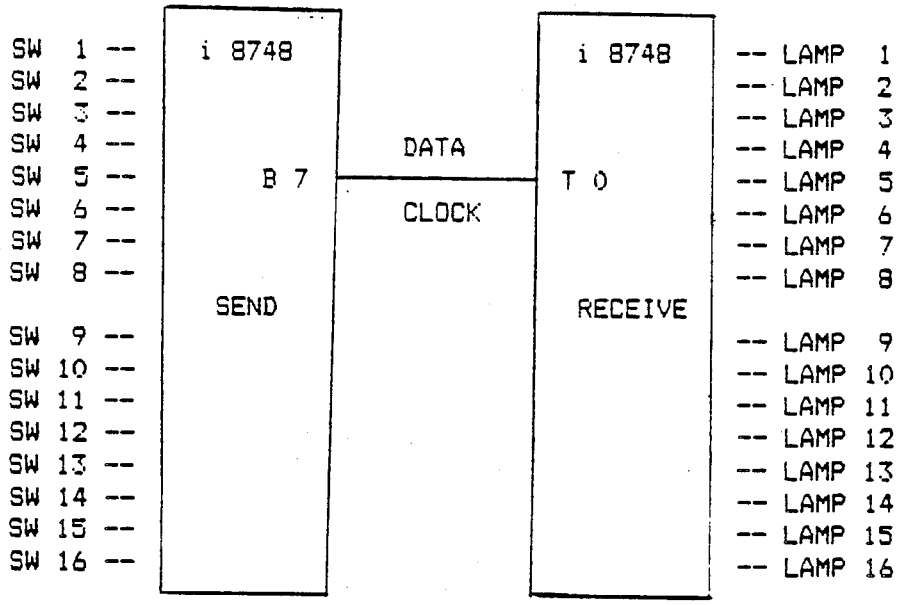
```
          +---+              +---+
DATA  0 __I   I___v_____I   I____        CHART    BIT 7,6,5
          I<- 500 ->I                                    0 0 0
                                             NO. 6      1 0 0
          +----------v----+   +---------     NO. 8-1    0 1 0
DATA  1 __I              I___I                NO. 8-2   1 0 1
                                             NO. 9      1 1 0
          I<--- 750 ---->I                   NO. 2      0 1 1
                                             NO. 4      1 1 1
    v   is DATA READ POINT                   FULL SIZE  0 0 1
  UNIT is micro second
```
MAIN ROUTINE
```
     ORG   0
     JMP   START
     ORG   7
     JMP   TIMEINT
     ORG   10H
```

```
START    DIS    I                DISABLE H/W INTERRUPT
         DIS    TCNTI            DISABLE TIMER INTERRUPT
         CLR    A                CLEAR ACC
         OUTL   P1,A             INITIALIZE I/O PORT 1
         OUTL   P2,A             INITIALIZE I/O PORT 2
         OUTL   BUS,A            INITIALIZE BUS PORT
         MOV    T,A              CLEAR TIMER/COUNTER
         ORL    P2,#0E0H         ENABLE READ BITS ON I/O PORT 2
LOOPX    CALL   RECEIVE          RECEIVE DATA FROM T0
         CALL   DECIDE           DECIDE BIT COMBINATION
         CALL   DISPLAY          DISPLAY SUBROUTINE
         JMP    LOOPX            MAIN LOOP

TIMER INTERRUPT HANDLING ROUTINE

TIMEINT  NOP                     NO OPERATION
         STOP   TCNT             STOP TIMER/COUNTER
         DIS    TCNTI            DISABLE TIMER/COUNTER
         CLR    A                CLEAR ACC
         MOV    T,A              CLEAR TIMER/COUNTER
         MOV    R0,#9            SET HIGH ADDRESS
         MOV    @R0,#03H         SET JUMP HIGH ADDRESS
         DEC    R0               DECREMENT R0
         MOV    @R0,#0           SET JUMP LOW ADDRESS
         MOV    A,#09H           SET PSW DATA
         MOV    PSW,A            SET P.S.W
         RETR                    RETURN

TIME DELAY SUBROUTINE

ITIME    NOP                     NO OPERATION   2.5 usec
         NOP                     NO OPERATION   5.0 usec
         DJNZ   R2,ITIME         LOOP TIME      10.0 usec
         RET

RECEIVE ALL DATA

RECEIVE  MOV    R0,#20H          SET ADDRESS OF RAW DATA
         CLR    A                CLEAR ACC
         MOV    @R0,A            CLEAR RAW DATA AREA 1
         INC    R0               INCREMENT ADDRESS
         MOV    @R0,A            CLEAR RAW DATA AREA 2
         DEC    R0               DECREMENT ADDRESS OF RAW DATA
         CALL   RCVLOOP          RECEIVE DATA SUBROUTINE
         RET

DATA READ SUBROUTINE

RCVLOOP  MOV    R1,#2            SET TOTAL LOOP COUNT
PRELOOP  NOP                     NO OPERATION
         JNT0   PRELOOP          IF T0 = ON THEN GOTO NEXT
         JNT0   PRELOOP          IF T0 = ON THEN GOTO NEXT
         MOV    R3,#8            SET LOOP COUNT 9
         CLR    A                CLEAR ACC
         MOV    T,A              CLEAR TIMER/COUNTER
         ANL    P2,#0E0H         CLEAR I/O PORT 2 WITHOUT READ BITS
         EN     TCNTI            ENABLE TIMER/COUNTER
         STRT   T                START TIMER
         JMP    LOOP1            GOTO LOOP1
```

```
MLOOP   MOV     R3,#8           SET LOOP COUNT 8
LOOP0   NOP                     NO OPERATION
        JT0     LOOP0           IF T0 = OFF THEN GOTO NEXT
        JT0     LOOP0           IF T0 = OFF THEN GOTO NEXT
LOOP1   NOP                     NO OPERATION
        JNT0    LOOP1           IF T0 = ON THEN GOTO NEXT
        JNT0    LOOP1           IF T0 = ON THEN GOTO NEXT
        MOV     R2,#50          SET TIME COUNT 50 [ 500 usec ]
        CALL    ITIME           TIME DELAY 500 usec
        MOV     A,@R0           LOAD DATA FROM INDIRECT R0
        JT0     RCV01           IF T0 = ON THEN STORE DATA 1
        JMP     NEXT0           JUMP NEXT
RCV01   ORL     A,#80H          SET DATA 1
NEXT0   RR      A               ROTATE ACC RIGHT
        MOV     @R0,A           STORE DATA TO INDIRECT R0
        DJNZ    R3,LOOP0        RECEIVE LOOP
        INC     R0              INCREMENT R0
        DJNZ    R1,MLOOP        MAIN LOOP
        DEC     R0              DECREMENT R0 [ SET SECOND RAW DATA ADDRESS
        MOV     A,@R0           LOAD SECOND DATA
        CPL     A               COMPLEMENT ACC
        MOV     R7,A            STORE DATA TO R7
        DEC     R0              DECREMENT R0 [ RAW DATA ADDRESS ]
        MOV     A,@R0           LOAD FIRST DATA
        CPL     A               COMPLEMENT ACC
        MOV     R6,A            RESTORE DATA TO R6
        STOP    TCNT            STOP TIMER/COUNTER
        DIS     TCNTI           DISABLE TIMER/COUNTER
        RET

DECIDE BIT COMBINATION FOR DISPLAY DATA

DECIDE  CLR     A               CLEAR ACC
        MOV     R0,A            CLEAR R0
        MOV     R1,A            CLEAR R1
        IN      A,P2            READ I/O PORT 2 DATA
        CPL     A               COMPLEMENT ACC
        ANL     A,#0E0H         AND X'E0' TO ACC
        MOV     R3,A            STORE ACC TO R3
        JNZ     DECIDE1         IF CHART ON ?
        ANL     P2,#0E0H        CLEAR I/O PORT 2 WITHOUT READ BITS
        CLR     A               CLEAR ACC
        OUTL    P1,A            CLEAR I/O PORT 1
        OUTL    BUS,A           CLEAR BUS PORT
        RET
DECIDE1 MOV     A,R3            MOV R3 DATA TO ACC
        XRL     A,#20H          BIT 5 is ON ?
        JZ      CFULL           IF ACC = 0 THEN GOTO FULL SIZE
        MOV     A,R3            LOAD R3 DATA
        XRL     A,#0C0H         BIT 7 and BIT 6 are ON ?
        JZ      CSIZE90         IF ACC = 0 THEN GOTO SIZE 9
        MOV     A,R3            LOAD R3 DATA
        XRL     A,#0A0H         BIT 7 and BIT 5 are ON ?
        JZ      CSIZE82         IF ACC = 0 THEN GOTO SIZE 8-2
        MOV     A,R3            LOAD R3 DATA
        XRL     A,#40H          ONLY BIT 6 is ON ?
        JZ      CSIZE81         IF ACC = 0 THEN GOTO SIZE 8-1
```

```
          MOV      A,R3           LOAD R3 DATA
          XRL      A,#80H         ONLY BIT 7 is ON ?
          JZ       CSIZE60        IF ACC = 0 THEN GOTO SIZE 6
          MOV      A,R3           LOAD R3 DATA
          XRL      A,#60H         BIT 6 and BIT 5 are ON ?
          JZ       CSIZE20        IF ACC = 0 THEN GOTO SIZE 2
          MOV      A,R3           LOAD R3 DATA
          XRL      A,#0E0H        BIT 7 , BIT 6 and BIT 5 are ON ?
          JZ       CSIZE40        IF ACC = 0 THEN GOTO SIZE 4
          ANL      P2,#0E0H       CLEAR I/O PORT 2 WITHOUT READ BITS
          CLR      A              CLEAR ACC
          OUTL     P1,A           CLEAR I/O PORT 1
          OUTL     BUS,A          CLEAR BUS PORT
          RET
CFULL     CALL     FULL           CALL FULL SIZE
          RET
CSIZE20   CALL     SIZE20         CALL SIZE 2
          RET
CSIZE40   CALL     SIZE40         CALL SIZE 4
          RET
CSIZE60   CALL     SIZE60         CALL SIZE 6
          RET
CSIZE81   CALL     SIZE81         CALL SIZE 8-1
          RET
CSIZE82   CALL     SIZE82         CALL SIZE 8-2
          RET
CSIZE90   CALL     SIZE90         CALL SIZE 9
          RET

BIT COMBINATION SIZE 2

ORG      100H
SIZE20    MOV      A,R6           LOAD DATA FROM R6
          JB7      NEXT20         IF BIT 7 IS ON THEN GOTO NEXT 20
          MOV      R4,#0FCH       STORE X'FC' TO R4
          CALL     STORER0        STORE DATA TO R0
NEXT20    JB6      RETS20         IF BIT 6 IS ON THEN GOTO RETURN
          MOV      R4,#7EH        STORE X'7E' TO R4
          CALL     STORER1        STORE DATA TO R1
RETS20    RET

BIT COMBINATION SIZE 4

SIZE40    MOV      A,R6           LOAD DATA FROM R6
          JB7      NEXT40         IF BIT 7 IS ON THEN GOTO NEXT 40
          MOV      R4,#90H        STORE X'90' TO R4
          CALL     STORER0        STORE DATA TO R0
NEXT40    JB6      NEXT41         IF BIT 6 IS ON THEN GOTO NEXT 41
          MOV      R4,#21H        STORE X'24' TO R4
          CALL     STORER0        STORE DATA TO R0
NEXT41    JB5      NEXT42         IF BIT 5 IS ON THEN GOTO NEXT 42
          MOV      R4,#48H        STORE X'48' TO R4
          CALL     STORER1        STORE DATA TO R1
NEXT42    JB4      RETS40         IF BIT 4 IS ON THEN GOTO RETURN
          MOV      R4,#12H        STORE X'12' TO R4
          CALL     STORER1        STORE DATA TO R1
RETS40    RET
```

BIT COMBINATION SIZE 6

```
SIZE60    MOV    A,R6           LOAD DATA FROM R6
          JB7    NEXT60         IF BIT 7 IS ON THEN GOTO NEXT 60
          MOV    R4,#80H        STORE X'80' TO R4
          CALL   STORER0        STORE DATA TO R0
NEXT60    JB6    NEXT61         IF BIT 6 IS ON THEN GOTO NEXT 61
          MOV    R4,#20H        STORE X'20' TO R4
          CALL   STORER0        STORE DATA TO R0
NEXT61    JB5    NEXT62         IF BIT 5 IS ON THEN GOTO NEXT 62
          MOV    R4,#02H        STORE X'02' TO R4
          CALL   STORER0        STORE DATA TO R0
NEXT62    JB4    NEXT63         IF BIT 4 IS ON THEN GOTO NEXT 63
          MOV    R4,#80H        STORE X'80' TO R4
          CALL   STORER1        STORE DATA TO R1
NEXT63    JB3    NEXT64         IF BIT 3 IS ON THEN GOTO NEXT 64
          MOV    R4,#08H        STORE X'08' TO R4
          CALL   STORER1        STORE DATA TO R1
NEXT64    JB2    RETS60         IF BIT 2 IS ON THEN GOTO RETURN
          MOV    R4,#02H        STORE X'02' TO R4
          CALL   STORER1        STORE DATA TO R1
RETS60    RET
```

BIT COMBINATION SIZE 8-1

```
SIZE81    MOV    A,R6           LOAD DATA FROM R6
          JB7    NEXT810        IF BIT 7 IS ON THEN GOTO NEXT 810
          MOV    R4,#80H        STORE X'80' TO R4
          CALL   STORER0        STORE DATA TO R0
NEXT810   JB6    NEXT811        IF BIT 6 IS ON THEN GOTO NEXT 811
          MOV    R4,#20H        STORE X'20' TO R4
          CALL   STORER0        STORE DATA TO R0
NEXT811   JB5    NEXT812        IF BIT 5 IS ON THEN GOTO NEXT 812
          MOV    R4,#08H        STORE X'08' TO R4
          CALL   STORER0        STORE DATA TO R0
NEXT812   JB4    NEXT813        IF BIT 4 IS ON THEN GOTO NEXT 813
          MOV    R4,#02H        STORE X'02' TO R4
          CALL   STORER0        STORE DATA TO R0
NEXT813   JB3    NEXT814        IF BIT 3 IS ON THEN GOTO NEXT 814
          MOV    R4,#80H        STORE X'80' TO R4
          CALL   STORER1        STORE DATA TO R1
NEXT814   JB2    NEXT815        IF BIT 2 IS ON THEN GOTO NEXT 815
          MOV    R4,#20H        STORE X'20' TO R4
          CALL   STORER1        STORE DATA TO R1
NEXT815   JB1    NEXT816        IF BIT 1 IS ON THEN GOTO NEXT 816
          MOV    R4,#08H        STORE X'08' TO R4
          CALL   STORER1        STORE DATA TO R1
NEXT816   JB0    RETS81         IF BIT 0 IS ON THEN GOTO RETURN
          MOV    R4,#02H        STORE X'02' TO R4
          CALL   STORER1        STORE DATA TO R1
RETS81    RET
```

BIT COMBINATION SIZE 8-2

```
SIZE82    MOV    A,R6           LOAD DATA FROM R6
          JB7    NEXT820        IF BIT 7 IS ON THEN GOTO NEXT 820
          MOV    R4,#80H        STORE X'80' TO R4
          CALL   STORER0        STORE DATA TO R0
```

```
NEXT820  JB6    NEXT821        IF BIT 6 IS ON THEN GOTO NEXT 821
         MOV    R4,#20H        STORE X'20' TO R4
         CALL   STORER0        STORE DATA TO R0
NEXT821  JB5    NEXT822        IF BIT 5 IS ON THEN GOTO NEXT 822
         MOV    R4,#10H        STORE X'10' TO R4
         CALL   STORER0        STORE DATA TO R0
NEXT822  JB4    NEXT823        IF BIT 4 IS ON THEN GOTO NEXT 823
         MOV    R4,#04H        STORE X'04' TO R4
         CALL   STORER0        STORE DATA TO R0
NEXT823  JB3    NEXT824        IF BIT 3 IS ON THEN GOTO NEXT 824
         MOV    R4,#40H        STORE X'40' TO R4
         CALL   STORER1        STORE DATA TO R1
NEXT824  JB2    NEXT825        IF BIT 2 IS ON THEN GOTO NEXT 825
         MOV    R4,#10H        STORE X'10' TO R4
         CALL   STORER1        STORE DATA TO R1
NEXT825  JB1    NEXT826        IF BIT 1 IS ON THEN GOTO NEXT 826
         MOV    R4,#08H        STORE X'08' TO R4
         CALL   STORER1        STORE DATA TO R1
NEXT826  JB0    RETS82         IF BIT 0 IS ON THEN GOTO RETURN
         MOV    R4,#02H        STORE X'02' TO R4
         CALL   STORER1        STORE DATA TO R1
RETS82   RET

BIT COMBINATION SIZE 9

ORG    200H
SIZE90   MOV    A,R6           LOAD DATA FROM R6
         JB7    NEXT90         IF BIT 7 IS ON THEN GOTO NEXT 90
         MOV    R4,#80H        STORE X'80' TO R4
         CALL   STORER0        STORE DATA TO R0
NEXT90   JB6    NEXT91         IF BIT 6 IS ON THEN GOTO NEXT 91
         MOV    R4,#40H        STORE X'40' TO R4
         CALL   STORER0        STORE DATA TO R0
NEXT91   JB5    NEXT92         IF BIT 5 IS ON THEN GOTO NEXT 92
         MOV    R4,#20H        STORE X'20' TO R4
         CALL   STORER0        STORE DATA TO R0
NEXT92   JB4    NEXT93         IF BIT 4 IS ON THEN GOTO NEXT 93
         MOV    R4,#02H        STORE X'02' TO R4
         CALL   STORER0        STORE DATA TO R0
NEXT93   JB3    NEXT94         IF BIT 3 IS ON THEN GOTO NEXT 94
         MOV    R4,#01H        STORE X'01' TO R4
         CALL   STORER0        STORE DATA TO R0
NEXT94   JB2    NEXT95         IF BIT 2 IS ON THEN GOTO NEXT 95
         MOV    R4,#80H        STORE X'80' TO R4
         CALL   STORER1        STORE DATA TO R1
NEXT95   JB1    NEXT96         IF BIT 1 IS ON THEN GOTO NEXT 96
         MOV    R4,#08H        STORE X'08' TO R4
         CALL   STORER1        STORE DATA TO R1
NEXT96   JB0    NEXT97         IF BIT 0 IS ON THEN GOTO NEXT 97
         MOV    R4,#04H        STORE X'04' TO R4
         CALL   STORER1        STORE DATA TO R1
NEXT97   MOV    A,R7           LOAD DATA FROM R7
         JB7    RETS90         IF BIT 7 IS ON THEN GOTO RETURN
         MOV    R4,#02H        STORE X'02' TO R4
         CALL   STORER1        STORE DATA TO R1
RETS90   RET
```

BIT COMBINATION SIZE FULL

```
FULL    MOV     A,R6            LOAD DATA FROM R6
        CPL     A               COMPLEMENT ACC
        MOV     R0,A            STORE DATA TO R0
        MOV     A,R7            LOAD DATA FROM R7
        CPL     A               COMPLEMENT ACC
        MOV     R1,A            STORE DATA TO R1
        RET
```

DATA STORE SUBROUTINE 1

```
STORER0 MOV     A,R0            LOAD DATA FROM R0
        ORL     A,R4            OR IMMEDIATE DATA
        MOV     R0,A            RESTORE DATA TO R0
        MOV     A,R6            LOAD DATA FROM R6
        RET
```

DATA STORE SUBROUTINE 2

```
STORER1 MOV     A,R1            LOAD DATA FROM R1
        ORL     A,R4            OR IMMEDIATE DATA
        MOV     R1,A            RETORE DATA TO R1
        MOV     A,R6            LOAD DATA FROM R6
        RET
```

DISPLAY DATA

```
DISPLAY MOV     A,R0            LOAD DISPLAY DATA 1
        OUTL    P1,A            DISPLAY
        MOV     A,R1            LOAD DISPLAY DATA 2
        OUTL    BUS,A           DISPLAY
        RET
```

DATA ERROR HANDLING ROUTINE

```
        ORG     300H
DMISS   NOP                     NO OPERATION
        ORL     P2,#01H         DISPLAY ERROR BIT
        JMP     LOOPX           JUMP MAIN LOOP
        END
```

I claim:

1. In a picture display case: a frame; a light panel supported in said frame; a plurality of lamps fixedly mounted on said light panel in spaced relationship; support means in said frame for removably receiving and supporting different selected picture panels individually with the different picture panels containing varying numbers and sizes of pictures as well as different arrangements of pictures, such panels being supported in front of said light panel so that all of the pictures on the particular picture panel in said frame can be illuminated individually by the selective energization of said lamps; control means connected to regulate the transmission of electrical energy to regulate the transmission of electrical energy to said lamps and actuatable for producing the energization of said lamps in different sequences and different combinations for illuminating all of the pictures on the panel selectively; and adjusting means connected to be actuated according to the panel in said frame for adjusting said control means to energize said lamps in the particular sequence and particular combinations that accommodate the number of pictures on the selected picture panel in the machine and the arrangement or size of such pictures on the panel.

2. A picture display case according to claim 1 including a divider selected from a group of dividers and removably supported by said frame between said light panel and the picture panel with the selected divider having openings that align with the pictures in the selected panel for framing each picture and the lamp or combination of lamps that illuminates it so that the light from the lamp or combination of lamps is confined to the area of the picture, and said adjusting means is responsive to the particular divider in said frame.

3. A picture display case according to claim 1 wherein said control means comprises a group of switches connected to an electric circuit and manually actuatable selectively for energizing said lamps selectively and the number of switches in said group is at least equal to the number of lamps on said light panel so each of said lamps can be energized individually or simultaneously with other lamps in different combinations; and said adjusting means is operable to vary the connection of said switches to said lamps so that the number of switches that are required will always operate in sequence beginning with the first switch of the group for illuminating the pictures on the selected panel individually in a specific sequence.

4. A picture display case according to claim 1 including means for identifying each of the panels to be placed in the frame; and reading means in position to read said identifying means for each panel placed in the frame to produce a signal identifying the number and arrangement of the pictures on the picture panel placed in said frame; and means responsive to said signal for actuating said adjusting means to adjust said control means to connect those switches required for energizing the lamps needed for illuminating the pictures on the selected panel.

5. A picture display case according to claim 4 including a divider removably supported by said frame between said light panel and said picture panel and having openings that align with the pictures in the panel for framing each picture and the lamp or combination of lamps that illuminates it, and said identifying means is mounted on said divider to actuate said reading means for producing said identifying signal for actuating said adjusting means when a divider is placed in said frame.

6. A picture display case according to claim 4 wherein said adjusting means comprises a receive processor connected to receive said identifying signal from said reader means and including means connecting said switches with said receive processor for transmitting selection data to said receive processor identifying the pictures selected for illumination; and means connecting said receive processor with said lamps for controlling the energization of said lamps in response to said identifying signal and said selection date.

* * * * *